United States Patent

[11] 3,568,198

[72] Inventors: Sidney Borowitz
New York;
Norman Caplan, Brooklyn; Gordon C. Dewey; Milton Stoller, New York, N.Y.
[21] Appl. No. 285,557
[22] Filed May 31, 1963
[45] Patented Mar. 2, 1971
[73] Assignee the United States of America as represented by the Secretary of the Army

[54] CORRELATION CURVATURE RADAR
11 Claims, 7 Drawing Figs.
[52] U.S. Cl. .................................................. 343/112, 343/6, 343/11, 343/100
[51] Int. Cl. .................................................. G01s 5/14

[50] Field of Search.......................................... 343/112, 110.7, 6 (DF), 11

[56] References Cited
UNITED STATES PATENTS
3,025,520   3/1962   Werner et al. ................   343/112X Primary Examiner—Rodney D. Bennett, Jr.
Assistant Examiner—Richard E. Berger
Attorneys—Edward J. Kelly, Albert Berl, Harry M. Saragovitz and Julian C. Keppler ABSTRACT: Short base line range measuring system having a plurality of receiving stations in a circle and a central station. Correlation techniques are used with pairs of stations connected sequentially through coarse and fine delay lines, and processing the signals to determine range.

INVENTORS,
Sidney Borowitz
Norman Caplan
Gordon C. Dewey
Milton Stoller

BY: Harry M. Saragovitz,
Edward J. Kelly,
Herbert Berl &
Julian C. Keppler
ATTORNEYS.

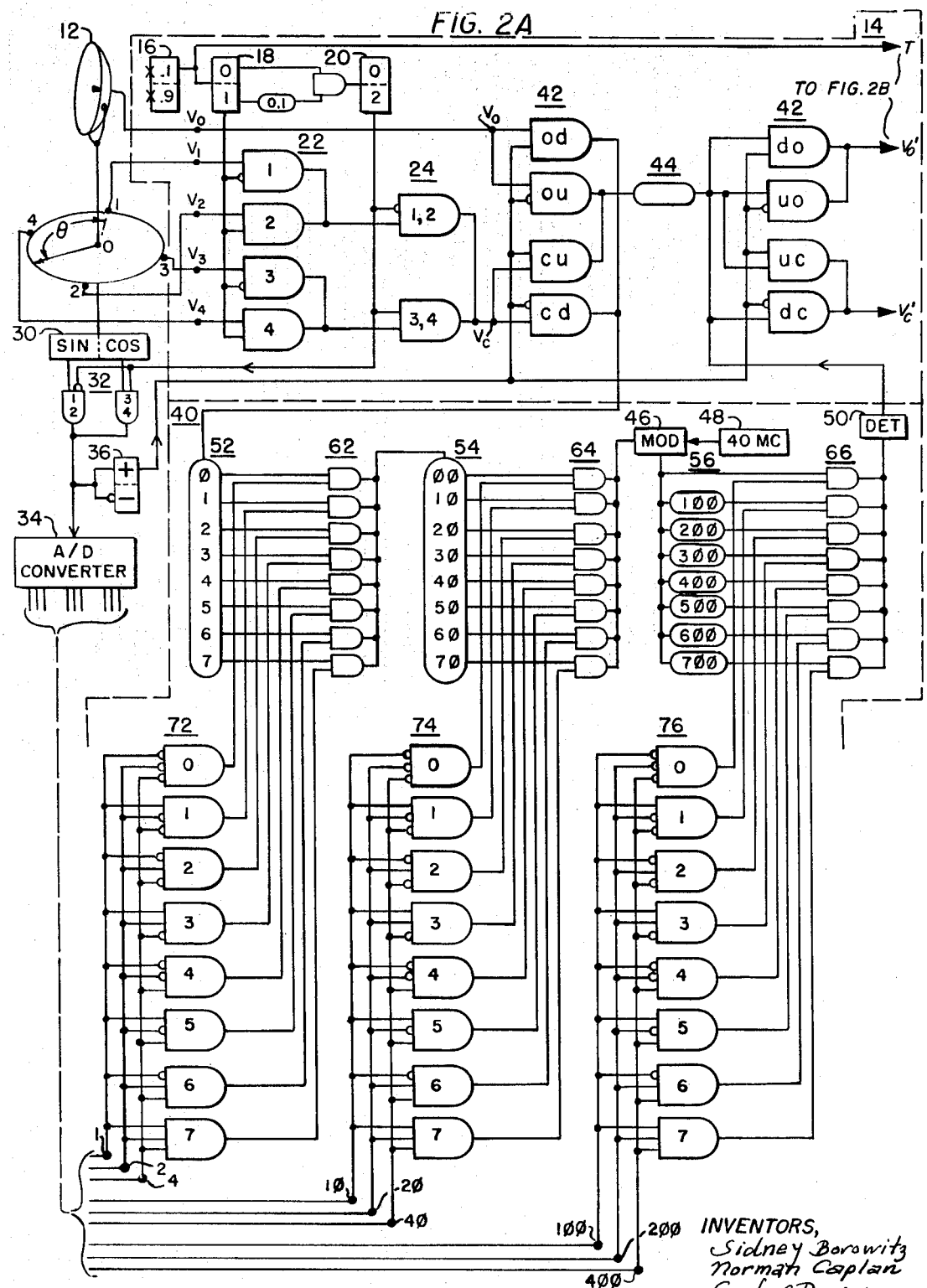

CORRELATION CURVATURE RADAR

The present invention relates to the measurement of differences between arrival times of radar signals, particularly in an active or passive radar system using a small receiver array, for example, of the order of one-tenth the intended range.

Determination of the location relative to a base point of a prospective target at some unknown range radiating (or reradiating) energy actually always involves time measurements, although often interpreted as direction measurements when relatively small time differences are involved. A difference in propagation rate in various media may cause error by changing the time differences. The trigonometry is most clearly illustrated in terms of distances but readily converted by the assumed propagation rate to correspond to the actual measurements in terms of time.

In the case of a radar echo, the range is measured directly and accurately by the round trip echo time, while the direction is often merely that of the antenna for maximum echo; actually this direction corresponds to a condition in which the time difference of arrival at the receiver from all parts of the antenna or its reflector is reduced to a minimum. Determining only range from two or more known locations the position may also be determined. A reversal of the techniques may be used to locate the radar.

In other than echo techniques analysis from the standpoint of direction is usually the simplest. With an array of directional stations not too close to a straight line from the target, the intersection of the bearing readings determines the location. Sometimes each directional station involves a small array of nondirectional elements arranged to determine direction of relatively remote targets.

With a large array of nondirectional stations each pair may establish a hyperbola corresponding to the location, and intersection of two such hyperbolas at a substantial angle may establish position. The asymptotes of such hyperbolas for very remote targets correspond to the directions noted above for very small arrays. With the present array preferably of five stations, at the center end and at the four quadrant points on the circumference, the range and direction can be determined by relatively simple trigonometry.

The system of the present invention is of the type disclosed in applications Ser. Nos. 788,462 and 788,463, filed Jan. 26, 1959. The range of a target is obtained by comparing the difference between the arrival times of the signals received at the outer stations and the center station. The systems are capable of operating on target echoes or waves radiated by a radar transmitter, or alternatively, operating on the waves radiated by the target, where, for example, the target is a jamming station. This may be expressed by saying that the systems are capable of operating in an active as well as a passive mode. For convenience in shifting from one mode to the other as conditions change the data rate in the two modes should be compatible, most readily obtained by using the radar pulse for synchronizing in both modes and the radar receiver as the center station of the array.

An important requirement of a system of this type is its capability of being defended. All stations must, therefore, be located within a defended area, that is, an area of limited extent of no more, perhaps, than 20 miles.

Another important requirement and object of the invention is its ability to function when jammed with a directive antenna. Since all stations of the system must receive the same radiation from a jammer, the stations must be sufficiently close together to fall within a practical directive jammer antenna beam width. This also requires that the baselines be 20 miles or shorter.

Still another important object and requirement of the system is its ability to function in the presence of multiple targets, without target indications merging into a single "center of gravity" return and also without the generation of spurious indications or ghosts.

Still another important characteristic of the system is full 360° coverage. This requirement leads to the use of five receiving stations rather than the use of three stations which would otherwise be possible.

It is thus a general object of the invention to provide a short baseline active-passive detection system having improved characteristics and advantages. The prior systems disclosed in the above-mentioned applications of James F. Bartram and Dewey et al. required a large number of multiplications of the signals, as a result of which there was a deterioration of the signal-to-noise ratio. The present system avoids numerous multiplications and uses instead simple correlation; therefore, higher signal-to-noise ratios are obtainable. The multiplications in the prior systems also gave rise to the possibility of ghosts. The present system has the advantage that no spurious signals are generated by predetection multiplications.

Still another advantage of the present system is that it does not require the numerous band-splitting filters used in the systems disclosed in the prior applications.

Further advantages of the present system over the previously described systems are that the geometry of the stations is not so exacting, and nonorthogonal, nonequal baselines can be used.

A still further advantage of the present invention is that highly stable microwave links are not necessary and the conventional microwave links may be used.

Further objects and advantages of the invention will be fully understood from the following description and the drawing, in which:

FIG. 1a to 1c show the geometry of the system;

FIG. 2a and 2b together provide a block diagram of the system;

The invention will be described with reference to a system of FIG. 1 containing five stations, comprising a center station 0 and outer stations 1, 2, 3, and 4. Stations 1, 0, and 2 and stations 3, 0, and 4 may be referred to as two triads. The center station may have an active radar system including a transmitter in which the receiver is used for the dual purpose of serving as a radar receiver and as one of the passive detection stations of the present system. The other stations are shown at the ends of baselines $L$ which for simplicity of calculations may be equal and orthogonal, but not necessarily so. The distance of the center station to a target 10 is designated $r$ and the distance from the other stations are $r_1$, $r_2$, etc. The time of arrival of the signal from target 10 at the various stations is $t_0$, $t_1$, $t_2$, $t_3$ and $t_4$. The diagrams are represented in terms of physical distance or range although measurements will be in terms of time involving the conversion factor $c$ corresponding to the propagation velocity. A suitable baseline length $L$ is 7 to 9 miles and the system may have a range of 30 to 200 miles.

Figure 1A:
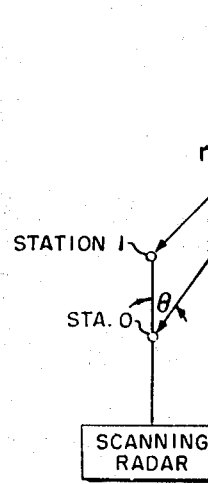
Figure 1B:
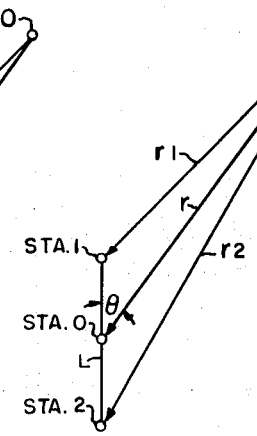
Figure 1C:
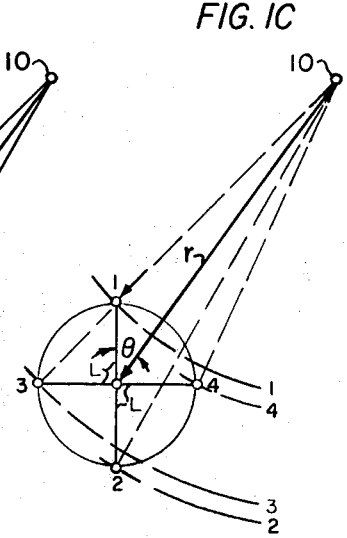

Applying the law of cosines (the Pythagorean theorem extended to other than right triangles) to the geometry of FIG. 1 we obtain the equation $$r_1^2 = r^2 + L^2 - 2\cos\theta \qquad (1).$$

In order to correspond to the actual time rather than distance measurements, but remembering for later use that range $r = t_0 c$, dividing equation (1) by $c^2$ (where $c$ equals the velocity of light) gives $$t_1^2 = t_0^2 + L^2/c^2 - 2(L/c) t_0 \cos\theta \qquad (2).$$

A Taylor series expansion of the above equation yields $$t_1 - t_0 = -(L/c) \cos\theta + (L^2/2t_0 c^2) \sin^2\theta \qquad (3),$$

and similarly $$t_2 - t_0 = +(L/c) \cos\theta + (L^2/2t_0 c^2) \sin^2\theta \qquad (4).$$

The sum of equations (3) and (4), since $\cos\theta$ terms cancel, is $$t_1 + t_2 - 2t_0 = (L^2/t_0 c^2) \sin^2\theta \qquad (5),$$

and similarly for stations 3 and 4, since $\sin\theta$ terms would cancel $$t_1+t_2-2t_0 = t_d^2 (\sin^2 \theta) / t_0 \quad (5)'$$

$$t_1+t_2+t_3+t_4-4t_0 = L^2/tc^2 = L^2/r \quad (7).$$

It may be helpful for analysis to isolate the fraction $L/c$, equal to $t_d$ (representing maximum propagation time directly between station 0 and stations 1, 2, 3, and 4) in formulas (2) to (7), designating the new formulas by a prime, as:

$$t_1^2 = t_0^2+t_d^2-2t_d t_0 \cos \theta \quad (2)'$$

$$t_1-t_0 = -t_d \cos \theta + t_d^2 (\sin^2 \theta) / 2 t_0 \quad (3)'$$

$$t_2-t_0 = +t_d \cos \theta + t_d^2 (\sin^2 \theta) / 2 t_0 \quad (4)'$$

$$t_1+t_2-2t_0 = t_d^2 (\sin^2 \theta) / t_0 \quad (5)'$$

$$t_3+t_4-2t_0 = t_d^2 (\cos^2 \theta) / t_0 \quad (6)'$$

$$t_1+t_2+t_3+t_4-4t_0 = t_d^2/t_0 = (L/c)^2/t_0 = L^2/t_0 c^2 = L^2/rc \quad (7)'$$

It can be seen that in equation (5) the cosine term no longer appears and that the remaining term is strongly range dependent but includes the $\sin^2$ term. This equation is solvable because the radar system at the center station gives the value of $\theta$. In a single triad consisting of stations 1, 2 and 0, for example, the value of $\theta$ thus given could be used to determine the range, and if two triads are employed the most favorable triad may be selected for targets in a given azimuth. On the other hand, it is apparent from equation (7) that by even simpler calculation when two triads are used, one obtains from the time differences a quantity solely dependent upon range.

It is also apparent that this represents the difference between the average time to stations 1, 2, 3, and 4 and the time to station 0, and that such difference would be very small when array is small compared to range, especially if expressed in the form:

$$r=L^2/(t_1+t_2+t_3+t_4-4t_0)c$$

Equation (7) is solved in the systems described in the above-mentioned prior applications. In those systems the signals of four outlying stations are multiplied together pair by pair and the pairs are multiplied again, at which point simple correlation is employed. These systems are called predetection multiple correlation systems. By contrast, the present system is called a postdetection multiple correlation system, since the multiple correlation of the time delays required to obtain range are now performed after conversion to video to obtain certain components of the time differences between the center and individual circumferential stations, and after actual evaluation of such time difference components to obtain the range. Typically the video may extend up to 5 mc. and down to a relatively low frequency, not in any case as low as the radar repetition rate such as 500 cycles. The system, however, presents a problem in that the two terms which make up the measured time difference (see equations (3) and (4)) contain a term $(L/c) \cos \theta$, dependent only on direction, which is very much larger than the second term $(L^2/2oc^2) \sin^2 \theta$, equal to $(L^2/2c) \sin^2 \theta$, dependent also on range $r$. Therefore, the correlator includes a coarse delay line system to substantially cancel out the $(L/c) \cos \theta$ term, as well as a fine delay line having taps on which the target detections are made. Thus, a system is obtained in which a smaller number of delay line taps, with multipliers connected thereto, are required. Accurate measurement of the time delay by a single system of this kind, however, would not be possible unless the coarse delays have very precise values and such precise values of long delay times are extremely difficult to obtain in practice. It will be explained later how this difficulty is overcome.

For simplicity in reducing the need for word legends, etc. the drawings use various logic symbols generally corresponding to those of U.S. Army MIL-STD-806A, such as:

a. the most universal D-shaped shield for AND gate,
b. a shield with one concave and two convex sides for OR gate,
c. a rounded end narrow rectangle for a delay device,
d. a small circle (or half circle to distinguish from other uses of a circle) for NOT or inhibit input or output of gates or sometimes other circuits,
e. a short rectangle (suggestive of the two alternative "sides") for a "binary" or two-state stable or quasi-stable circuit such as a flip-flop,
f. a long rectangle (suggestive of the several binary stages) for a shift register.

In the case of binaries, such sides may be further emphasized by a dotted divider line with:

a. outputs from either or both sides,
b. ordinary inputs to either or both sides,
c. complement or count input at such divider line,
d. an "X" suggestive that an input is nonessential to the corresponding side (as in monostable or astable circuits, which may also have an ordinary input for such purposes as synchronizing),
e. a common input direct to one side and through a NOT circuit to the other side suggestive of Schmitt trigger operation (a binary output but not strictly binary input).

Generally signal flow is from left and top toward right and bottom, but signal direction arrows are used on some leads to emphasize, clarify, or remove ambiguity. Since word legends are not essential, numerical values are often shown to identify the weight significance of the sides of common binaries, the time in bauds, microseconds ($\mu$s.), etc. of delays and unstable side of binaries, the transition levels of Schmitt triggers in volts, amperes, etc. (or merely polarity), or references to related components or signals. Although intended mainly for binary logic the delay the gate symbols are used also for analogue signals (only one analogue input always shown on the flat side of the symbol for AND gates). Standard symbols avoid language problems involved in word legends and usually are both clearer and considerably simpler than corresponding schematics; even an AND gate shown in logic form with delayed and direct inputs from the two sides of a binary (as in counters and shift registers) clarifies the operation, while the schematic of an elementary capacitor coupling to respond to one polarity transition would also be rather simple but would require details of the binary to avoid ambiguity.

Referring now to the block diagram of the system shown in FIG. 2a the signals from the several stations of FIG. 1 are indicated at terminals $V_0$, $V_1$, $V_2$, $V_3$, and $V_4$. Signal $V_0$ is obtained from a receiver at directional radar antenna 12 at the center position 0 and the others from nondirectional receivers at the circumferential positions 1, 2, 3, 4. The precise time of $V_0$ is to be determined relative to each of the other signals $V_1$, $V_2$, $V_3$, and $V_4$, designated as $V_c$ to avoid repeated mention of all the alternatives. To accomplish the time comparison with a minimum of equipment, particularly delay devices of precise calibration, a switching system 14 controlled by a simple sequencing arrangement is shown as an astable clock unit 16 operating, in the usual manner, bistable binary counter stages 18 for weight 1 and 20 for weight 2; the transition coupling for such stages has been mentioned in the above discussion of symbols. Ordinarily these stages would be interpreted as counting 0, 1, 2, 3 but are herein applied to switch voltages $V_1$, $V_2$, $V_3$, $V_4$ (having subscript digits one unit larger in each case). A weight 1 state of stage 18 is arranged to open gates $22_2$ and $22_4$, closing gates $22_1$ and $22_3$. Similarly a weight 2 state of stage 20 is arranged to open gate $24_{3,4}$, closing gate $24_{1,2}$. In each case the zero state involves the opposite gate conditions. Thus, in the zero state of both counter stages, signal $V_1$ traverses the groups of gates 22 and 24, and with successive total output weights 1, 2, and 3, signals $V_2$, $V_3$, and $V_4$ respectively traverse the groups in regular sequence, appearing as $V_c$.

It may now be noted that a change in only the weight 1 output of stage 18 involves only one triad. For any one source such change corresponds to only a reversal of the algebraic sign of the major (range independent) portion of the total difference between $V_o$ and $V_c$ but does not affect the very small (range dependent) portion. This small portion could determine the overall sign of such difference only if the signal source were very near normal to the triad. On the other hand, a change in the weight 2 output of stage 20 involves the selection of the other triad. Such change therefore usually corresponds to a change in the magnitude of the large range independent portion of the difference between $V_o$ and $V_c$, as determined quantitatively by the function $\sin \theta$ and $\cos \theta$, equal in magnitude only at $45° + n\,\Pi/2$.

Delay devices are arranged for digital control in accordance with the range independent directional functions already noted. Therefore the azimuth rotation of antenna 12 is arranged to control a sine–cosine function generator 30. Gates $33_{1,2}$ and $32_{3,4}$ controlled by the weight 2 output of counter unit 20 provide the appropriate sine or cosine output corresponding to the selected gates $24_{1,2}$ or $24_{3,4}$. This output controls an analogue-to-digital converter 34 to generate signals for control of the coarse delay system 40 discussed below, which provides substantially the range independent portion of the time difference between $V_o$ and $V_c$. Only the sine or cosine amplitude is pertinent to the amount of delay needed, but the polarity identifies which of the signals $V_o$ or $V_c$ must be delayed in each case. For this purpose a polarity responsive network could be included in the converter but instead is shown as a Schmitt Trigger 36, the plus output of which is connected to gates $42_{od, ou, cu, cd}$ to connect the delay system 40 into the path of $V_o$ or $V_c$ as may be appropriate to the direction of the source. Alternative means for control of the switching might be found simpler in practice but more confusing to explain, or at each selection of $V_c$ both $V_o$ and $V_c$ might be delayed in turn, only one providing a correlation reading. In view of the digital control of delay 40 it would be only approximately correct; therefore a small known delay 44 is shown in the relatively undelayed path to assure that the fine delay system of FIG. 2b as noted below can attain a proper phase for correlation.

The present coarse delay system 40 involves the simplicity of binary techniques, but by merely grouping binary digits in groups of three ($2^3 = 8$) is illustrated on the basis of octal radix numbering. This involves a plan and number of digits generally analogous to that required for the familiar decimal radix numbering, so that even those not familiar with different radices can readily recognize the similarities and differences. The numerals 8 and 9 do not appear, and as a reminder that the information is not in usual decimal radix the zero is here written "0," a symbol often used in teleytpe to distinguish figure "0" from letter "∅." The time is expressed in somewhat arbitrary quanta for simplicity in the numbers, also avoiding the need for the usual digit (decimal) point between the units and fractional digits; the most convenient values of such quanta will depend on the array dimensions and other parameters of the system.

The coarse delay system consists of tapped delay lines 52 and 54 and delay units 56 and suitable controls for providing the coarse delay required. Delay line 52 has a number of taps providing delays as indicated from ∅ to 7. These taps are controlled by gates $62_0$ to $62_7$. The second delay line 54 is similarly provided with a number of taps having larger delays than in the delay line 52, illustrated as ∅ to 7∅, which are similarly controlled by gates $64_0$ to $64_7$. The output of these gates $64_0$ to $64_7$ is connected to a suitable modulator 46, also supplied with an input from the heterodyning oscillator 48, which typically may have a frequency of 40 megacycles. The output of this modulator is impressed on the further delay units 56 also shown as delay lines and having the range of indicated delays from ∅ to 7∅∅. The delay devices 56 actually may be quartz delay lines, for example. The outputs of the delay devices 56 are also controlled by similar gates $66_0$ to $66_7$ in the same manner as the output of delay lines 52 and 54. The output of these gates completing the coarse delay system is also controlled by Schmitt trigger 36 thru further gates $42_{do, uo,}$ $uc, dc$ complementary to the other gates controlled thereby, which separate these signals in a manner to isolate the original signal $V_o$ and $V_c$ now designated $V_o'$ and $V_c'$ in view of the delay usually introduced. To select a desired time delay, $(L/C) \cos \theta$, or $(L/C) \sin \theta$, the various gates $62_0$ to $62_7$, $64_0$ to $64_7$, and $66_0$ to $66_7$ are controlled by corresponding binary gates $72_0$ to $72_7$, $74_0$ to $74_7$, and $76_0$ to $76_7$ actuated by combinations of binary inputs from the converter 34 representing octal values 1, 2, 4, 1∅, 2∅, 4∅, 1∅∅, 2∅∅, and 4∅∅, or the absence of such inputs if the connection is shown thru a half circle NOT symbol.

The coarse delays $(L/c) \cos \theta$ and $(L/c) \sin \theta$, being dependent only on $\theta$, are readily determined by the azimuth of the scanning radar antenna of the center station. Thus the coarse time delays for discrete values of $\theta$ can be established, and each time delay determines a binary set of pulses from converter 34 which will set the coarse delay system to the required value. It is not feasible, however, to provide exact values of coarse delay. If delays $\Delta + (L/c) \cos \theta$ are added and subtracted in equations (3) and (4), where $\Delta$ is the error, we obtain $$t_1' = \Delta + (L^2/2t_o c) \sin 2\theta \qquad (8),$$

$$t_2' = \Delta + (L^2/2t_o c) \sin 2\theta \qquad (9)$$

The errors are of opposite signs and cancel when the two pairs of time measurements are added together for multiple correlation.

As a preliminary to the correlation techniques below it will be helpful to recognize that terms such as conversion, mixing, modulation, multiplying, and correlation merely emphasize different aspects of interrelated phenomena, usually based on circuit (or sometimes even physiological) nonlinearities and exclusion of unwanted components by filtering (of high or low frequency), balancing, or both, usually eliminating original inputs. Similar but not identical phenomena are sometimes confused in analyzing a particular situation. In ordinary amplitude modulation of carrier $F_c$ by signal $F_s$ two mirror imaged envelopes $F_s$ not crossing the axis reveal the carrier $F_c$ still present (not eliminated) and lesser amplitude sidebands $F_c + F_s$ and $F_c - F_s$ which sometimes reinforce and sometimes oppose the carrier. In suppressed carrier modulation or voltage multiplication these envelopes cross on the axis, the envelopes on each side of axis somewhat resembling a full wave rectifier form and consequently involving a substantial $2 F_s$ component and lesser components at $4 F_s$ and higher frequencies; the apparent carrierlike component reverses phase at each axis crossing since the carrier is eliminated. In mixing the same waveforms are involved from a different viewpoint, inputs corresponding to $F_C + F_s$ and $F_C - F_s$, and usual $2 F_s$ envelope component separated by filtering being equal to the difference $2 F_s$ between inputs; instead of the envelope component a $2 F_c$ component equal to the sum can be separated by rectifying the high frequency variations, thus eliminating the effect of phase reversal noted above. Sum and difference frequencies are involved in each case, but must be identified by a proper choice of terms. Balancing is common for carrier signal suppression, but modulating signal in a different frequency range is often excluded by inherent filtering of the system; balancing may be arranged for both signals when in the same frequency range as frequently involved in multipliers. For the operations involved herein the terms conversion and multiplying appear most suitable.

Figure 2B:
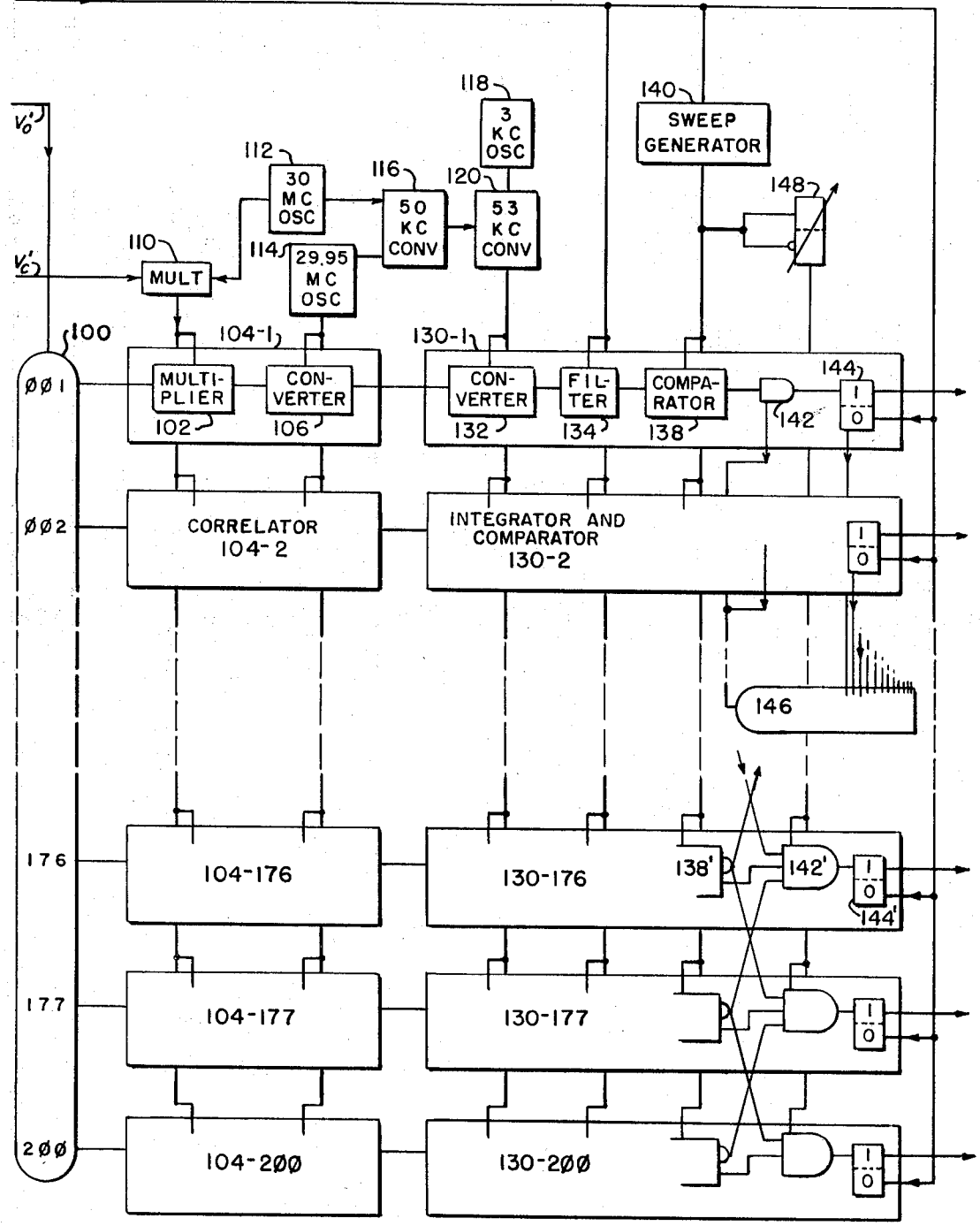

Referring now to FIG. 2b the signals $V_o'$ are fed to the fine delay line 100 providing delays of an order of magnitude corresponding to the range dependent terms of equations (3) and (4), namely $$(L^2/2t_o c^2) \sin^2 \theta,$$

combined in equation (5) and the corresponding terms combined in equation (6) although not separately shown above $(L^2/2t_oc^2)\cos^2\theta$.

The delay line is provided with a number of taps, assumed as octal 2∅∅ (decimal 128) in number, each connected to a multiplier circuit 102 of corresponding correlator unit 104–1. The signals $V_c'$ are fed first thru a similar multiplier 110 to which a 30 mc. signal is also fed from oscillator 112, then to multiplier circuit 102 of all correlator units 104–1, 104–2, etc. Each such correlator also includes a frequency converter 106 all supplied with a 29.95 kc. signal from oscillator 114, to convert the 30 mc. signals from multipliers 102 to 50 kc. as an input for integrator comparator circuits 130–1, 130–2, etc. The outputs of oscillators 112 and 114 also provide a steady 50 kc. signal in converter 116. The 3 kc. output of a further oscillator 118 is combined with this 50 kc. signal in converter 120 to produce a steady 53 kc. signal.

For analysis it may be assumed that all sidebands are used, although in practice some may be eliminated. Also only typical signal $V_o$ and $V_c$ frequency components such as 2 mc. may be followed thru portions of the system as illustrative of other components. In multiplier 110 this component would be converted to 28 and 32 mc. In further multiplier 102 it would be converted to 26 and 34 mc. and a 30 mc. component from each vehicle which would be in phase if the 2 mc. component of signals $V_o$ and $V_c$ were in phase, to provide a 30 mc. output from the 2 mc. component. In order to get a strong 30 mc. output of multiplier 102 all frequency components of $V_o$ and $V_c$ would have to be in phase, for complex functions this can occur only when waveforms as a whole are equally delayed. If only one set of sidebands were used each frequency component would provide a 30 mc. output, but they still would combine in proper phase only when waveforms as a whole are equally delayed the same as in the case indicated above. This output might exist temporarily even if waveforms as a whole are not equally delayed. The remaining components are to select the strongest sustained 30 mc. outputs in each clock pulse interval. Once the correlation has occurred the frequency range can be reduced in the converters 106 and 132 to any convenient levels.

In the integrator comparator circuits 130–1, 130–2, etc. each converter 132 changes the corresponding 50 kc. input to 3 kc. Each filter 134 integrates the 3 kc. input during one clock interval to build up a voltage output corresponding to the effectiveness in correlating the time delays; a pulse on line T from the clock generator 16 of FIG. 2a shorts out the filter at the beginning of each clock interval. It may be found convenient to use alternative filters, each to integrate one signal and store it for reading while the other is integrating, a common technique in Kineplex systems. The filter outputs may be assumed to be converted to a DC level for convenience in analyzing the comparators to be considered below. In any given clock interval the various filter outputs would differ since the signals $V_o'$ for the different filters have been subjected to different delays in line 100, and that filter will have a maximum signal which is connected to a tap on delay line 100 providing a delay corresponding to the difference in time of arrival of the signals at the pair of stations being sensed for that interval. For example, if stations 0 and 1 have been sensed, the taps of delay line 100 providing the right delay, $(L/2tC^2)\sin^2\theta$, will produce a maximum signal in filter 134 connected thereto.

For determining which filter has the maximum signal, they are connected to comparator circuits 138 which receive not only these outputs but also a sweep voltage, preferably of decreasing magnitude, from sweep generator 140, preferably synchronized with switching circuits 14 by pulses from clock 16 so that one sweep is provided each time a pair of stations at center point 0 and one of circumferential points 1, 2, 3, or 4 is selected. When the sweep voltage equals, or has a given value relative to the output of the filters, comparator circuits 138 produce an output supplied through gating and inhibiting circuits 142 to bistable units 144. The arrangement is such that when the sweep voltage falls to the maximum of the outputs of the several filters the corresponding comparator will provide an output thru the AND gate 142 to set a bistable unit 144 to the 1 state. If alternative filters are used the sweep can occupy the entire clock interval, otherwise the sweep would have to be more rapid to act in only the last part of such interval.

In the case of integrator and comparator circuits 130–1 and 130–2 the connections of comparators 138, AND gates 142, and bistable units 144 are oversimplified to operate only for the largest filter output of the entire system. When several sources of energy are operating at once it is desirable to obtain separate correlations for each; in units 130—176 to 130—2∅∅ the corresponding connections are shown in the more sophisticated form suited to such operation.

The outputs from the 0 side of bistable units 144 in integrator and comparator circuits 130–1 and 130–2 are shown connected thru AND gate 146 back to the corresponding AND gates 142. As soon as one bistable unit 144 changes to the 1 state the gates 142 prevent any further bistable unit 144 from being changed to such state. Adjustable Schmitt Trigger circuit 148 connected to the sawtooth generator is also connected to AND gate 146 to prevent any unit 144 from being set to the 1 state by a filter output too low to be reliable. In each successive clock interval the time delay of the signal from a particular circumferential station is compared to that from the center station, appearing on the appropriate bistable unit 144 which can include an output indicator. Since only the sum of four successive delay readings is required for determining range it is usually unnecessary to identify them separately although the information for doing so is readily available at the counter units 18 and 20. The bistable units 144 are reset to zero by a clock pulse T at the end of each reading in order to be reset to zero for the next reading. An output connection from which each bistable unit 144 may be used for indicators or direct connection to a range computer, not a part of this invention.

In the integrator and comparator circuits 130—177 to 130—2∅∅ the connections are shown in an alternative manner to provide readings for multiple signal sources. In this case a NOT symbol is shown at one output from the comparator 138' of each circuit 130—177 to 130—2∅∅. The NOT output is connected to the AND gates 142' of the two adjacent circuits while a direct output from the comparator 138' is connected to the AND gate 142' of the same circuit, as in the case of the oversimplified version in 130–1 and 130–2. The output and reset connections are also unchanged. In this case the output of Schmitt Trigger 148 is connected directly to the several AND gates 142' since the purpose of AND gate 146 is now covered by the NOT or inhibit connections from comparators 138' to AND gates 142': The Schmitt Trigger may also be considered as another comparator similar to 138 or 138' with an adjustable bias input. A NOT function was accomplished in the prior version by connecting from the 0 side of bistable units 144 and did not require a separate NOT symbol.

Figure 3:
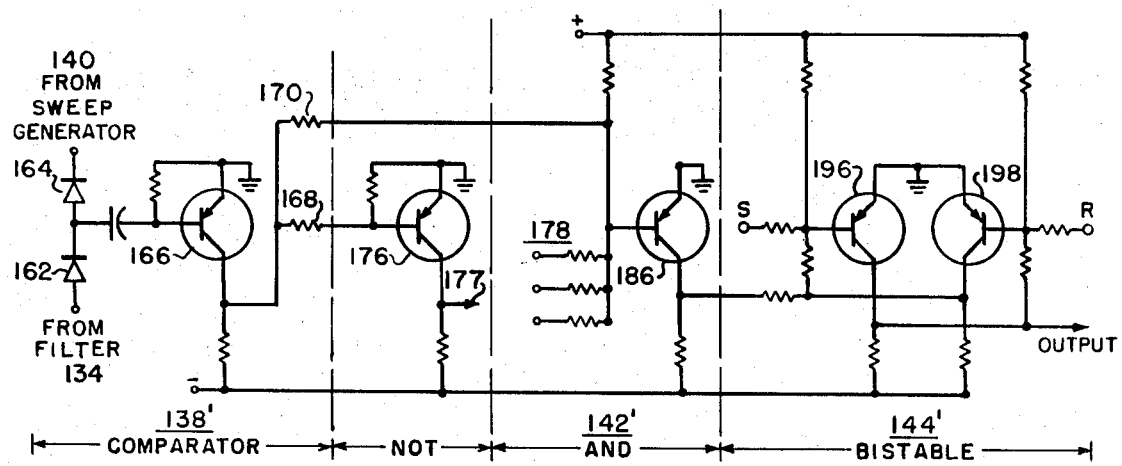
FIG. 3 is a schematic diagram of the comparator circuit.
Figure 4:
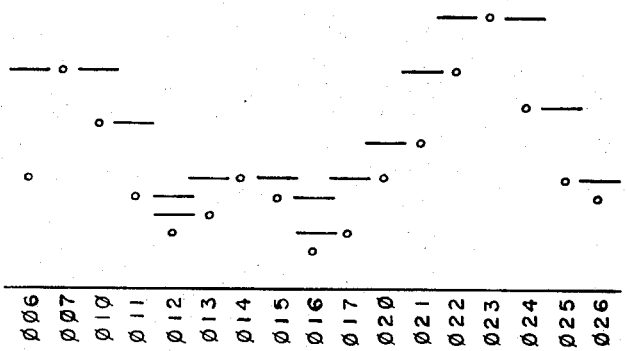
FIG. 4 shows a typical pattern of output readings.

FIG. 3 is a schematic diagram of a typical set of such alternative components. The operation will first be clarified by reference to FIG. 4, in which output amplitudes corresponding to several taps on the delay line 100 are portrayed by small circles. Actually there are several conversions involved; the input time difference $t_o - t_c$ of interest is converted to the amplitude difference here involved at the output of filters 134, back to a different time difference at the output of comparators 138', then to binary amplitude differences at the several outputs of bistable units 144'. Several sources of energy are assumed as apparent from delays ∅∅7, ∅14, and ∅23 each producing higher outputs than for the next adjacent delays, which could only occur because of separate sources. In the comparator and inhibitor portions of the system, the corresponding correlators could each actuate the bistable circuit 144 before the adjacent comparator inhibits such a function. Furthermore, the NOT outputs of such comparators would inhibit later actuation of adjacent bistable units 144'; this is portrayed by the heavy lines at each side of these three small circles inhibiting actuation of adjacent bistable units 144′ corresponding to circles below. Even though such adjacent comparators cannot actuate the corresponding bistable units they also may inhibit later actuation of their adjacent units; this is also portrayed by the heavy lines—in this case only at one side. The inhibit function could be extended beyond the immediately adjacent circuits if desired to provide a greater separation between readings of similar amplitude.

The outputs of bistable units 144 for the pairs of stations of each triad may, preferably, be combined, so that the system, viewed as two triads, permits the two triads to be only approximately orthogonal. If only one triad were used the range could be found by adding a $\sin^2\theta$ or $\cos^2\theta$ term from the center station radar to the data at the outputs of units 144. In the preferred form of the invention using five stations, all data necessary for the obtaining of the range appears at such outputs. The particular indicating or computing apparatus used for presenting the range is not a part of this invention.

The integrator circuits and particularly the comparator and decision circuits 138 to 144 may obviously take many forms and one particular embodiment of such circuits is shown in FIG. 3.

The comparator circuit may consist primarily of a pair of silicon diodes 162 and 164 to which the outputs from the filter 134 and the sweep generator 140 are connected. Diodes 162 and 164 are connected in series with intermediate cathode of 162 and anode of 164 connected through a capacitor to the base electrode of a transistor 166 which acts as a grounded emitter amplifier. The amplifier is provided with suitable base and collector resistors and produces an output when the sweep voltage falls to a predetermined level with reference to the voltage impressed by the filter. The output from the collector electrode of transistor 166 is supplied thru coupling resistor 168 to another transistor amplifier 176, acting as an inverter or NOT circuit from whose collector electrode an inhibiting output voltage is derived on terminal 177. The output of transistor 166 is also supplied through resistor 170 to the base electrode of transistor amplifier 186. Other resistors 178 connect the base electrode of transistor amplifier 186 to the inhibiting connections 177 of the neighboring or adjacent integrator circuits, so that if their amplifiers 166 and 176 produce output pulses they bias the base electrode of amplifier 186 to cut off and inhibit the output of amplifier 186. If the latter is uninhibited by the reception of pulses on lines connected to resistors 178 and a pulse is received from transistor 166, amplifier 186 produces an output which is supplied to the bistable unit 144′ which includes the transistors 196 and 198 and their interconnecting resistors. The output is obtained on a line connected to the collector electrode of transistor 196. Bistable unit 144′ is reset by a pulse from clock 16 as previously mentioned with reference to FIG. 2 connected to terminal R. It will thus be seen that when the sweep voltage falls below the voltage supplied from the filter 134, amplifiers 166 and 176 operate the bistable unit 144′ to produce an output, provided inhibiting inputs have not been received from neighboring integrating circuits previously. At the same time, amplifiers 166 and 176 produce an output inhibiting pulse which may be supplied to several adjacent integrators to inhibit them. An actual diagram of such interconnections would soon become rather confusing although only a very moderate number of further components would be needed. The approximate boundaries in FIG. 2B of the logic symbols have been designated in the schematic of FIG. 3 for convenience in analyzing the operation. In some cases the precise boundaries might involve individual viewpoints, particularly since amplifiers are often assumed as merely inherent parts of the elements identified, not separately shown.

A particular embodiment of the invention has now been described to explain the principles of operation thereof, but it will be apparent to those skilled in the art that many variations and modifications of the apparatus herein disclosed may be made without departing from the spirit and scope of the invention as defined in the following claims.

We claim:

1. In a radiant energy system, the combination of five radiant energy receiving stations, one at the center of a circle having a radius of several miles and the others substantially equally spaced along the circumference of the circle, for locating a source of energy at unknown range from said center station and beyond said circle, a coarse delay means, means for setting said coarse delay means sequentially to discrete time delay values approximately equal to the range-independent portion of the difference in arrival time of said energy at pairs of said stations, each pair consisting of one said outer station and the said center station, a fine delay line having a plurality of taps for providing time delays substantially equal to the range-dependent portions of the difference in said arrival times, a separate multiplier circuit connected to each tap of said fine delay line, switch means for sequentially connecting said pairs of stations one at a time through said coarse delay means and said fine delay line to said multiplier circuits, whereby the signals from each pair of stations are sequentially combined in every multiplier circuit, means for separately integrating the output of each multiplier circuit, and means for determining which integrated value is a maximum, whereby the range-dependent time delays of all pairs of stations are determined sequentially.

2. The combination according to claim 1, wherein said last means includes means for registering the maximum integrated value and inhibiting means for preventing the registration of integrated values less than said maximum.

3. The combination according to claim 2, including means for removing the integrated values and restoring the inhibiting means to the normal noninhibiting condition.

4. The combination according to claim 3, wherein said center station includes a directional radar system and said receiving stations receive echoes of the waves transmitted by said directional radar system.

5. The combination according to claim 4, wherein said means for setting said coarse delay means includes switching means responsive to azimuthal data provided by said directional radar system.

6. In a radiant energy system, the combination of five omnidirectional radiant energy receiving stations adapted to receive the same signals, one station at the center of a circle having a radius of several miles and the other stations near the ends of orthogonal diameters of said circle, for locating a source of energy at unknown range from said center station and beyond said circle, a coarse time delay means, means for setting said coarse delay means sequentially to discrete time delay values approximately equal to the range-independent portion of the difference in arrival time of said energy at pairs of said stations consisting of one outer station and the center station, a fine delay means having a plurality of taps for providing time delays substantially equal to the range-dependent portions of the difference in said arrival times, a separate multiplier circuit connected to each tap of said fine delay means, switch means for sequentially connecting said pairs of stations through said coarse and fine delay means to said multiplier circuits to bring signals of each pair approximately into time coincidence, whereby said multiplier circuits combine the signals from each pair of stations, means for separately integrating the output of each multiplier circuit, and means for only selecting the maximum integrated output, whereby said range-dependent delays of all pairs of stations are determined sequentially.

7. In a radiant energy system, the combination of a plurality of radiant energy stations adapted to receive the same signals, one station being at the center of a circle and the other stations being equally spaced along the circumference of said circle, for locating a source of energy at unknown range from said center station and beyond said circle, an adjustable delay means, means for setting said delay means sequentially to time delay values each approximately equal to the range-independent portion of the difference in arrival time of said energy at pairs of said stations consisting of one said outer station and said center station, fine delay means having a plurality of output connections for providing different time delays, said fine delay means providing a delay substantially equal to the range-dependent portion of the difference in said arrival times, a separate multiplier circuit connected to each tap of said fine delay means, switch means for sequentially connecting said pairs of stations through said coarse and fine delay means to said multiplier circuits, whereby every multiplier circuit combines the signals from each pair of stations, means for separately integrating the output of each multiplier circuit, means for determining which integrated output is a maximum, whereby the range-dependent delays of all pairs of stations are determined sequentially.

8. In a radiant energy system, the combination of five like radiant energy receiving stations, one at the center of a circle having a radius of several miles and the others substantially equally spaced along the circumference of said circle, for locating a source of energy at unknown range from said center station and beyond said circle, a coarse delay means, means for setting said coarse delay means sequentially to discrete time delay values approximately equal to the range-independent portion of the difference in arrival time of said energy at pairs of said stations, each pair consisting of one said outer station and said center station, a fine delay line having a plurality of taps for providing time delays substantially equal to the range-dependent portions of the difference in said arrival times, switch means for sequentially connecting said pairs of stations one at a time through said delay means and delay line to bring the signals from the stations of each pair into approximate time coincidence at a particular tap of said fine delay line, and means for identifying that particular tap, whereby the range-dependent delays of all pairs of stations are determined sequentially.

9. In a radiant energy system, the combination of a plurality of radiant energy receiving stations adapted to receive the same signals, one station at the center of a circle having a radius of several miles and the others at substantially diametrically opposite points on said circle, for locating a source of energy at unknown range from said center station and beyond said circle, an adjustable coarse delay means, means for setting said coarse delay means sequentially to time delay values each approximately equal to the range-independent portion of the difference in arrival time of said energy at pairs of said stations consisting of one said outer station and said center station, fine delay means having a plurality of taps for providing different time delays so that the delay at one particular tap is substantially equal to the range-dependent portion of the arrival times, switch means for sequentially connecting the pairs of stations one pair at a time through the coarse and fine delay means to bring the signals of a pair of stations into approximate time coincidence at said particular tap, and means for identifying said particular tap and registering its value, whereby the range-dependent delays of all pairs of stations are determined sequentially.

10. The combination according to claim 9, wherein the center station includes a directional radar system and said receiving stations receive echoes of the waves transmitted by said directional radar system.

11. The combination according to claim 10, wherein the means for setting said coarse delay means includes switching means responsive to azimuthal data provided by said directional radar system.